W. K. FREEMAN.
PROCESS AND APPARATUS FOR HARVESTING THE VOLATILE CONSTITUENTS OF WOOD AND VEGETABLE SUBSTANCES.
APPLICATION FILED SEPT. 18, 1912.
1,169,325.
Patented Jan. 25, 1916.
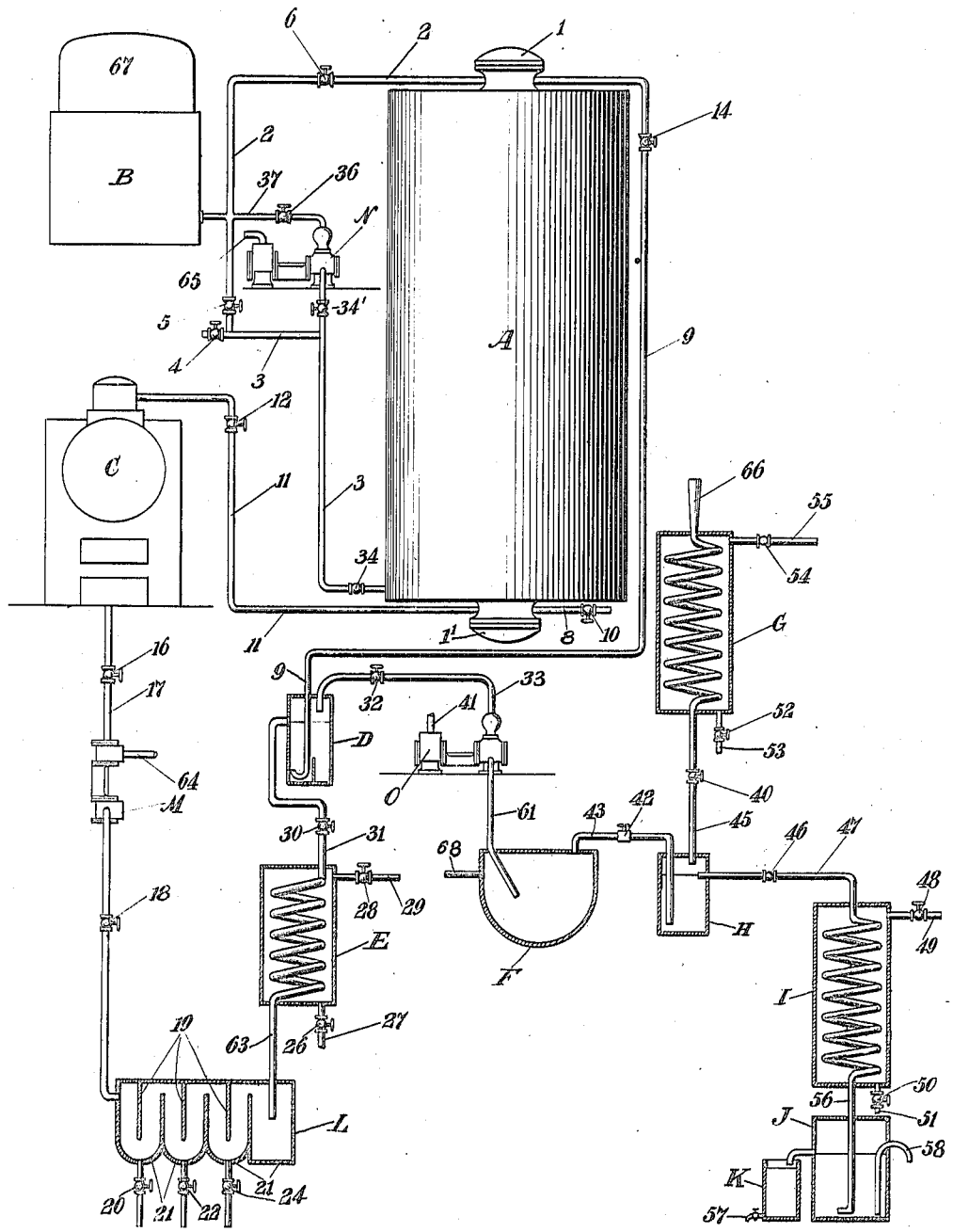
WITNESSES
INVENTOR

UNITED STATES PATENT OFFICE.

WALTER K. FREEMAN, OF OSCAWANA, NEW YORK, ASSIGNOR TO HYDROLOSE PROCESS CORPORATION, A CORPORATION OF NEW YORK.

PROCESS AND APPARATUS FOR HARVESTING THE VOLATILE CONSTITUENTS OF WOOD AND VEGETABLE SUBSTANCES.

1,169,325.  Specification of Letters Patent.  Patented Jan. 25, 1916.

Application filed September 18, 1912. Serial No. 721,061.

*To all whom it may concern:*

Be it known that I, WALTER K. FREEMAN, a citizen of the United States, residing at Oscawana, in the county of Westchester and State of New York, have invented certain new and useful Improvements in Processes and Apparatus for Harvesting the Volatile Constituents of Wood and Vegetable Substances, and the following is a specification.

This invention relates to an improved method process and an apparatus for extracting, separating and harvesting the volatile products from wood and vegetable substances, and especially for cleansing such materials as are intended for pulp for paper making stock, of ingredients that are injurious to the ultimate fiber or harmful in the process of reduction of the raw materials to pulp.

Among the important objects of the invention are, to provide a means of treating long leaf pine (*Pinus palustris*) in order to secure such products as the oil of turpentine, and a method for treating other pinaceous woods and plant substances to secure their respective volatile constituents; to provide a means for cleansing woods and vegetable matter of their natural oils, acids and gums, so as to fit them for reduction to pulp for paper making stock; to provide means for circulating the solution used in the reduction of wood and vegetable matter to pulp, while continuously separating the volatile substances from the flowing solution, whether it be in liquid or vapor form.

The invention briefly defined, consists of a closed digester or chamber charged with chips or comminuted wood from which the air is expelled by hydrogen gas, which gas is finally forced out of the digester by the gradual inflow of a suitable reduction solution which is ultimately caused to circulate through the digester and separate by reason of two influences, a pump arranged to keep the liquid flowing as it condenses while passing through apparatus connected with a pipe leading from the top of the digester, and a vacuum pump to exhaust the vapor and gases, and force them through suitable contrivances similar to, or substantially like, those illustrated by the accompanying drawings that show apparatus and devices which have for their purpose the separation of the volatile oils and other constituents from the wood or vegetable substances and finally, from the aromatic elements.

The essence of the invention is susceptible of many modifications and changes without necessarily departing from the spirit or purposes here expressed, and it is obvious that the process may be carried out with a variety of forms of apparatus.

The form of apparatus, their connections and the arrangement which appears to be the most suitable, are shown in the accompanying drawing, but I do not limit myself to this type of apparatus or arrangement, because they only serve as an aid to a clear description of the invention.

Apparently there is some necessity for a brief explanation of the principles upon which this invention is predicated; while it is known to chemists that hydrogen is an odorless, colorless, light gas, a powerful reducing agent and capable of removing oxygen and negative elements from their compounds, these facts may not be generally known to those engaged in this industry.

For the purposes of this invention, it must be assumed that the objective of plant life is the ultimate fiber, a substance composed of minute cells grouped together forming a bundle of fibrous materials with complex intercellular matter of varied ingredients in formative or complete state. In the long leaf pine, and generally in all pinaceous woods, the cells which have been developed from the proto-plasm are surrounded with a formative element, glucoside, and oleoresin, apparently a complete by-product of the vital force that created the plant structure, and while there may be other definite constituents existing, the object of this process is to effect and liberate the glucosides and oleoresins from which the oil of turpentine is derived, as well as to liberate other terpenes or acids from different kinds of wood or vegetable substances.

To operate the process in accordance with the invention, the apparatus illustrated in the accompanying drawings is used in the following manner. Chips, comminuted wood or vegetable materials are placed in a closed digester—A; the receiving or intake port, is closed airtight, and hydrogen or a similar gas is admitted, preferably at the top of the digester through pipe 2 by opening valve 6. The air contained in the digester and possibly some of the gas is allowed to escape to the atmosphere through pipe 3, by opening valves 4 and 34, the object being to exclude all the air from the presence of the materials under treatment. When this is done, the digester will be filled with only such materials as are to be treated, and gas; valve 4 is closed and valve 5 is then opened, and the gas contained in the digester will be subjected to the influence of the gasometer B, as determined by the weight of the dome 67, and an equal pressure will exist upon the surfaces of all the chips or particles of materials that are contained in the digester and the gas pressure of gasometer and digester will be alike. Now, if the pump N is started, valves 5 and 6 are closed, and 34' and 36 opened, the pressure of the gas in the digester can be increased so to penetrate more effectually the air cells and crevices of the material to remove the oxygen, finally if valves 6 and 34 be closed, the gasometer B and pump N perform no further functions and the digester A is then assumed to be hermetically closed.

Pipe 8 leads to a supply of cooking solution that will flow into the digester whenever valve 10 is opened. Now, if valves 6 and 10 be opened, the gaseous contents of the digester A will be caused to flow through pipe 2 to gasometer B, and when the desired quantity of cooking solution has been admitted, valves 6 and 10 are closed. Valve 12 is opened to admit steam through pipe 11 to the digester A, from steam boiler C. At the proper time valve 14 is opened to allow vapor and gases to pass through pipe 9 to separator D, where the liquid part escapes through pipe 31, when valve 30 is opened to the coil of the condenser E and pipe 63 to the separator L, from where it is taken by pump M to boiler C through pipe 17. Valves 16 and 18 are arranged for convenience and 20, 22 and 24 for removing sediments from compartments 21 of separator L. 19 represents baffle plates arranged in the separator.

Vacuum pump O is operated preferably by admission of steam through pipe 41, and when valve 32 is open and pump O is operated, it will create a vacuum and draw the vapor and gases from chamber D and convey them through pipes 33 and 61 to chamber F, an apparatus that under varying conditions or requirements, may be operated in several different ways; as a steam jacketed chamber for maintaining the normal temperature of the vapor and gases, or with super heated steam to raise the temperature, or with the circulation of cold fluids through the jacket to lower the temperature; or, by the admission of air, steam or gases into the chamber through pipe 68, to mix or mingle with the vapor delivered there from the separator D, or chemicals may be placed in chamber F and the vapor or gases taken from separator D may be caused to pass over or through such chemicals to cleanse or perfect the product of volatilization. For the purposes of this invention, however, the apparatus F may be considered a jacketed chamber for slightly increasing the temperature of the vapor and gases drawn from the separator D.

With pipe 68 closed, the vapor and gases flow through pipe 43 when valve 42 is opened into separator H. The lighter vapor and aromatic gases pass upward through pipe 45 when valve 40 is opened, and through the coil of the condenser G to pipe 66, which is open to the atmosphere. The pipe 45 and coil within the condenser G and pipe 66 are relatively large and long, so to prevent all product-bearing vapor from escaping to the atmosphere. The condensed vapor will flow downward through pipe 66 and coil of the condenser G and pipe 45 to the separator H, and then through valve 46, pipe 47, to the coil of the condenser I, then through pipe 56 to the bottom of the liquid separator J. The water passes off through overflow 58, while the oil or lighter product flows through the spigot 57 into receptacle K.

Cold water is circulated in condenser I through pipe 49 and 51, and is regulated by valves 48 and 50, and a water supply is furnished and circulated in condenser G through pipes 53 and 55 and is regulated by valves 52 and 54. Cold water in a similar manner is supplied to condenser E through pipes 27 and 29 and regulated by valves 26 and 28.

The gases that find their way from the digester A to the separator H, flow with such vapor as is present, upward through pipe 45, through the coil of condenser G, and escapes to the atmosphere through pipe 66.

In some instances it is expedient to force hydrogen into the digester A, during the period of reduction or extraction. This is accomplished by operating the gas pump N and creating a pressure of gas slightly in excess of the steam pressure maintained in the digester. Then, of course, there would be a continuous flow of hydrogen gas through pipe 66 to the atmosphere. It would be drawn from the gasometer B by the pump N, and conveyed through pipe 3 to digester A, and pipe 3 may be fitted and arranged within the digester for a perforated pipe or rose orifice, so as to distribute the gas through the fibrous materials being treated. The gas would flow upward through the digester and pass out through pipe 9 to the separator D through pipe 33 and vacuum pump O, to the chamber F, then through pipe 43 to separator H, through pipe 45 and coil of condenser G, and then through pipe 66 to the atmosphere.

From the foregoing description it is evident that a variety of modifications can be adapted in operating the process, and many elements can be brought to bear upon the substances placed in the digester for reduction, extracting or cleansing. In some instances there may be a dual objective; in other cases, the object sought may be to either cleanse the wood to fit it for reduction to pulp for paper making, or to simply harvest the essential oils, regardless of the disposition of the fibrous residue.

One of the purposes continuously observed is to expel or remove oxygen from the presence of whatever substance is being treated in the digester. It is understood, of course, that the oxygen to be expelled is of the air-free oxygen—oxygen of the atmosphere, as distinguished from oxygen as an element of water.

It is not deemed necessary to discuss any other theory of the effect of hydrogen in the extraction of deleterious ingredients from wood or vegetable matter intended for pulp, or in harvesting the essential oils from similar substances. It is sufficient to know that hydrogen removes the elements that cause oxidation, and if this be the total or only function it performs to cause the quicker reduction of wood to pulp, by the liberation of the volatile substances, it fulfils the requirements and satisfies the condition requisite for producing a better pulp and a larger yield of volatile products.

It is apparent that the two primary elements referred to in this specification, steam and gas, may be substituted by menstruums of various kinds with or independent of a cooking solution. Obviously, light hydrocarbon oils might be used for saturating the contents of the digester and removed by heat or steam and recovered. Alcohol might be used in a similar manner, as also several other suitable chemical compounds, but in every instance they would be subordinated to the final operation of separating them from the products or substances treated in the final reduction of the vegetable matter to pulp.

Having thus described my invention, what I claim as new and desire to secure by Letters Patent is:

1. In an apparatus for cleansing wood intended for reduction to pulp, of substances injurious to the ultimate fiber, the combination with a digester provided with an opening for receiving chips, comminuted wood or vegetable materials, an inlet for gas and an outlet for the discharge of the volatile products and vapor at the top, and an opening at the bottom for discharging the pulp and separate inlets for the admission of cooking solution, supply of steam and hydrogen gas, connected with their respective sources or generators to the digester, by means of suitable pipes fitted with valves to control them, and to direct the flowing gas into the digester or to a pump, for increasing the pressure of the gas above normal, a separator connected between the volatile product outlet located at the top of the digester, and an intake opening at the bottom of the steam generator, and a vacuum pump connected with such separator in a proper manner for drawing off the vapor that contains the volatile substances, and cause them to flow through another separator connected with a condenser having a coil terminating with an orifice open to the atmosphere, and a pipe leading from the side of the separator to a condenser for liquefying the products of volatilization substantially as shown, described and set forth in this specification.

2. The herein described process employed for treating wood and vegetable substances, for cleansing them of deleterious matter harmful to the process of their reduction to pulp which consists in circulating a part of the cooking solution through the digester, a separator and steam generator, and drawing off from the separator, the product-bearing vapor and gases and then flowing the vapor to and through another separator connected to a coil of a condenser, which coil is open to the atmosphere to provide a means for the escape of aromatic gases, and separating in the products of condensation, the oil from the water.

3. The process of recovering the oil or turpentine from resinous woods, by placing blocks, chips or comminuted material in a closed digester and expelling the air by means of hydrogen gas, and then allowing a suitable cooking solution to flow into the bottom of the digester to force the gas out, then admitting steam to heat the contents sufficiently to liberate the oil by vaporizing it, and continuously circulating a part of the cooking solution through the digester, a separator and the steam generator so that the vapor conveying the oleoresinous products will be continuously drawn from the hot cooking solution.

4. In an apparatus of the character described, a digester provided at the top for the admission of materials to be treated, means for supplying hydrogen gas and having an outlet for product-bearing gases and vapors, and at the bottom an outlet for the discharge of the converted material, and admission of cooking fluid and steam, and an outlet for gas through a pipe connected with a gasometer, a branch of such pipe being properly connected with a pump for reversing the flow of gas and increasing the pressure to cause it to flow into the bottom of the digester, and means whereby it may be confined there or allowed to escape through an opening at the top, or directly to the atmosphere, substantially as described and for the purposes set forth.

5. In an apparatus of the character described a digester, means for supplying to said digester, gas, cooking solution and steam, said digester being provided with a pipe for leading off the vapor and gases produced by the steam, a primary separator to which said pipe leads, a vacuum pump in said pipe, a modifying chamber, a secondary chamber for separating the volatile gases from the distillate, and a final separator wherein the distillate is separated into water and oil, substantially as described.

6. An apparatus of the character described, consisting of a digester, a primary and secondary separator, a vacuum pump arranged between the separators for drawing the product-bearing vapor from a reduction solution that is caused to circulate through the digester, separator and steam generator, in order that the volatile products that are liberated from the materials contained in the digester may be continuously removed during the process of reduction of such materials as are contained in the digester to pulp, and a vacuum pump whereby to effect the flowing of such vapor and gases, to and through a modifier to another separator connected with a condenser, and said condensers the coil of which is open to the atmosphere in order that all aromatic gases that emanate from the digester, may pass freely to the atmosphere, while the product of volatilization and condensation are secured as primary or by-product.

7. An apparatus of the character described, consisting of a steam generator, a means for supplying hydrogen gas or gases rich in hydrogen, a digester, a primary separator, a sediment collector, and a pump to assist in the circulation of the reduction solution, and a pump arranged in the gas service pipe for compressing or circulating the gas to the digester, a vacuum pump connected with the primary separator for drawing off the vapor and gases emanating from the digester, and directing such volatile products as may escape from the digester to and through a modifier, said modifier and a secondary separator where the gases and lighter vapors pass upward through a condenser, said condenser the coil of which is relatively large and long, being provided with an orifice open to the atmosphere for the escape of aromatic gases, while the liquid portion that is separated, flows downward through another condenser, and finally to a receptacle or reservoir as described in the drawings and set forth.

8. The process of treating woods which consists in inclosing said wood in a digester, driving out entrapped air by means of a hydrogen gas, introducing a cooking solution, heating said solution to a temperature sufficient to melt or volatilize the oils and resins of the wood, circulating said solution, removing the said oils and resins from said solution during circulation, and restoring the strength of the spent solution from time to time.

Signed at the borough of Manhattan, in the county of New York and State of New York, this 17th day of September, A. D. nineteen hundred and twelve.

WALTER K. FREEMAN.

Witnesses:
  John E. Prager,
  A. Worden Gibbs.